US012657325B2

(12) United States Patent
Stebbins et al.

(10) Patent No.: US 12,657,325 B2
(45) Date of Patent: Jun. 16, 2026

(54) SECRETS MANAGER WITH EPHEMERAL TOKEN AND MULTI-USE TOKEN

(71) Applicant: The Travelers Indemnity Company, Hartford, CT (US)

(72) Inventors: Tyler D. Stebbins, Wethersfield, CT (US); Kenneth C. Soukup, Chesterfield, VA (US); Gary C. Lewis, Windsor, CT (US); Dae Y. Lee, Manchester, CT (US); Jared W. Jamieson, Northford, CT (US)

(73) Assignee: THE TRAVELERS INDEMNITY COMPANY, Hartford, CT (US)

( * ) Notice: Subject to any disclaimer, the term of this patent is extended or adjusted under 35 U.S.C. 154(b) by 13 days.

(21) Appl. No.: 18/672,251

(22) Filed: May 23, 2024

(65) Prior Publication Data

US 2025/0363230 A1 Nov. 27, 2025

(51) Int. Cl.
| | |
|---|---|
| *H04L 29/06* | (2006.01) |
| *G06F 21/62* | (2013.01) |
| *H04L 9/32* | (2006.01) |
| *H04L 29/08* | (2006.01) |

(52) U.S. Cl.
CPC ........ G06F 21/6218 (2013.01); H04L 9/3228 (2013.01)

(58) Field of Classification Search
CPC ........................... G06F 21/6218; H04L 9/3228
USPC ........................................................ 726/4
See application file for complete search history.

(56) References Cited

U.S. PATENT DOCUMENTS

| | | | | |
|---|---|---|---|---|
| 11,716,312 B1 * | 8/2023 | McNamara, Jr. | ....... | G06F 21/46 |
| | | | | 726/6 |
| 12,074,865 B1 * | 8/2024 | Gunther | ................ | H04L 9/0869 |
| 2005/0242167 A1 * | 11/2005 | Kaario | ................ | H04M 1/7243 |
| | | | | 235/375 |
| 2015/0006880 A1 * | 1/2015 | Alculumbre | .......... | H04L 9/0825 |
| | | | | 713/153 |
| 2015/0095367 A1 * | 4/2015 | Mattsson | .............. | H04L 9/3213 |
| | | | | 707/769 |
| 2015/0254647 A1 * | 9/2015 | Bondesen | ............ | G06Q 20/385 |
| | | | | 705/41 |
| 2016/0019536 A1 * | 1/2016 | Ortiz | ...................... | G06Q 20/36 |
| | | | | 705/67 |
| 2016/0092486 A1 * | 3/2016 | Mattsson | ............ | G06F 16/2455 |
| | | | | 707/756 |
| 2019/0068594 A1 * | 2/2019 | Sarwar | .................. | G06F 21/602 |
| 2020/0099523 A1 * | 3/2020 | Jacobs | ................ | G06F 21/6245 |
| 2021/0099295 A1 * | 4/2021 | Li | .......................... | H04L 9/3226 |
| 2022/0076234 A1 * | 3/2022 | Bodalia | .............. | G06Q 20/3676 |

(Continued)

FOREIGN PATENT DOCUMENTS

| | | | | | | |
|---|---|---|---|---|---|---|
| CN | 114401278 A | * | 4/2022 | ........ | H04L 67/1097 |
| JP | 7209031 B2 | * | 1/2023 | ........ | G06Q 20/4016 |
| WO | WO-2018011630 A1 | * | 1/2018 | ........... | H04W 12/04 |

*Primary Examiner* — Haresh N Patel

(74) *Attorney, Agent, or Firm* — CANTOR COLBURN LLP

(57) ABSTRACT

A system includes a database, a plurality of memory resources, and a plurality of processor resources configured to access the memory resources and execute a plurality of instructions to perform a plurality of operations. The operations include generating a secret that encrypts a data value, wrapping the secret as an ephemeral token to store in the database under a multi-use token, deleting the input data value, and returning the multi-use token.

26 Claims, 13 Drawing Sheets

(56) References Cited

U.S. PATENT DOCUMENTS

| | | | |
|---|---|---|---|
| 2022/0104008 A1* | 3/2022 | Luo | G01S 1/0428 |
| 2023/0334140 A1* | 10/2023 | Vemula | G06F 21/44 |
| 2024/0121269 A1* | 4/2024 | Elbaz | H04L 63/0435 |
| 2025/0095000 A1* | 3/2025 | Niavis | G06Q 50/16 |
| 2025/0132911 A1* | 4/2025 | Jayaram | H04L 9/06 |

* cited by examiner

1000

1002
Producer:
Adds a secret

1004
System:
1. Creates secret
2. Wraps secret as
ephemeral token
3. Deletes secret 1006
Producer:
Producer shares
ephemeral token 1008
Consumer:
Decrypts secret 1010
System:
Deletes ephemeral
token

1100 ⟍

1102 ⟍
Generate a secret that encrypts a data value

1104 ⟍
Pass the secret to a data vault to store in a database

1106 ⟍
Wrap the secret as an ephemeral token to store in the database under a multi-use token 1108 ⟍
Delete the input data value 1110 ⟍
Return the multi-use token

1200

1202
Receive a multi-use token

1204
Post the multi-use token to a database

1206
Identify an ephemeral token in the database based on the multi-use token

1208
Decrypt a data value stored as a secret wrapped by the ephemeral token

1210
Remove the ephemeral token from the database

1212
Return the data value

SECRETS MANAGER WITH EPHEMERAL TOKEN AND MULTI-USE TOKEN

BACKGROUND

Short-lived secrets can be shared between computer system users, such as login information, encryption information, certificates, and/or other types of credentials. The intent of short-lived secrets is typically to provide sensitive information between computer system users, where after the secret is received and used, the secret is removed or otherwise blocked from later access. Some approaches to sharing secrets, such as email or messaging applications, can leave the secret exposed and possibly shared beyond an expected timeframe. Upon receiving and using a secret, the onus is typically on the recipient to delete the secret. Where the secret is sent through a shared platform, it is possible that the secret may remain visible for other computer system users to view. Further, even if a recipient deletes a received copy of a secret, the secret may still be accessible through the computer system of a user that sent the secret.

BRIEF DESCRIPTION OF THE DRAWINGS

The subject matter which is regarded as the invention is particularly pointed out and distinctly claimed in the claims at the conclusion of the specification. The features and advantages of the invention are apparent from the following detailed description taken in conjunction with the accompanying drawings in which:

DETAILED DESCRIPTION

According to an embodiment, a system for secrets management is provided. The system may be used for various practical applications of computer system security. Embodiments allow a user to encrypt sensitive information securely. Embodiments can also allow users to choose whom should receive the information and a time window in which the secret must be accessed. Access to the secret may only be granted once, and when limited to a specific recipient, the secret may only be accessed by a recipient who was granted access permission. The system can remove data associated with the secret after the secret has been accessed. A time-to-live constraint can also ensure that the secret is removed within a predetermined period if the secret is not accessed.

Figure 1A:
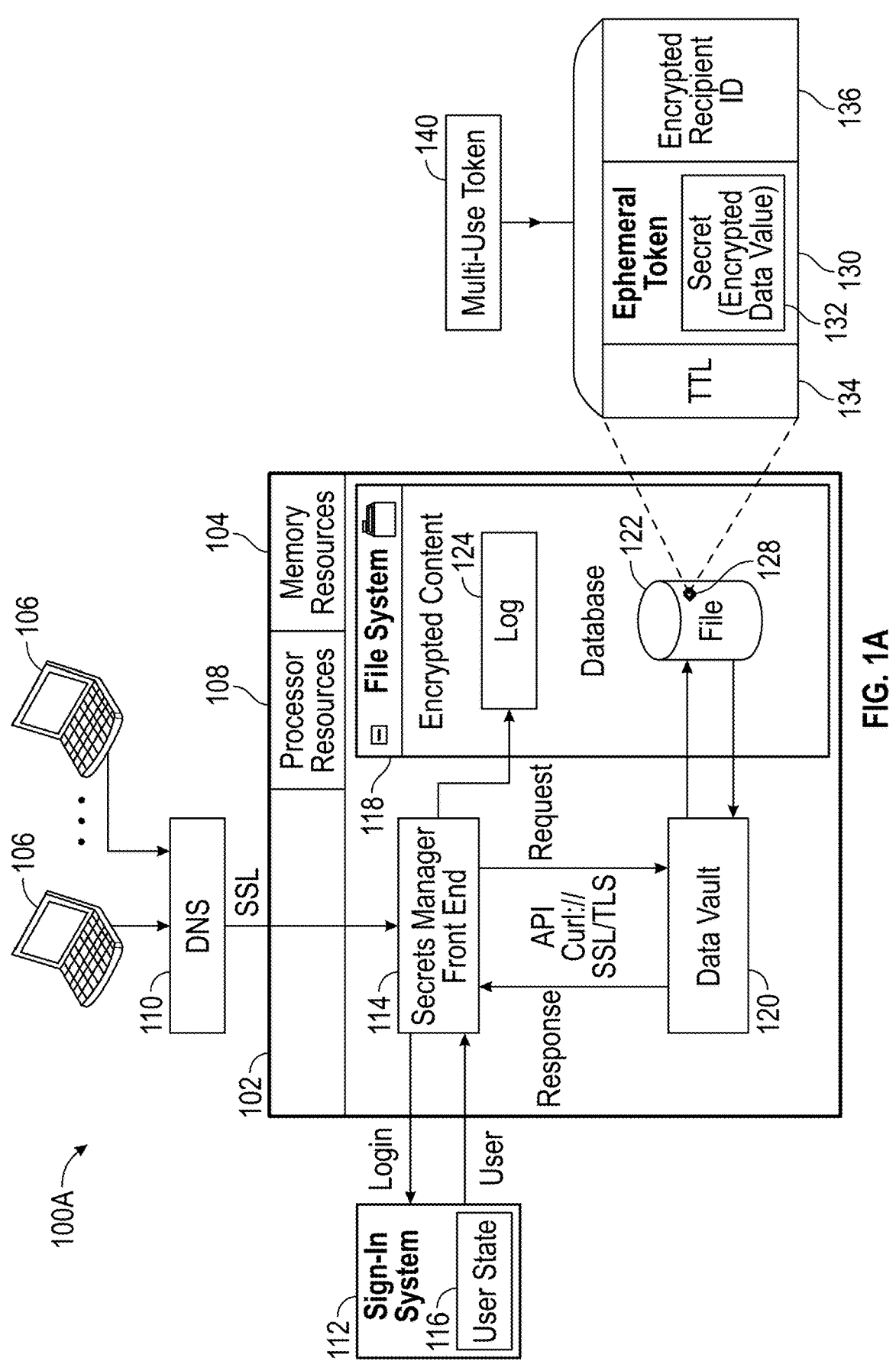
FIG. 1A depicts a block diagram of a system according to some embodiments of the present invention.

Turning now to FIG. 1A, a system 100A is depicted upon which a secrets manager may be implemented. The system 100A can include computing resources 102 accessible by two or more user systems 106, where one of the user systems 106 can act as a producer of a secret and one of the user systems 106 can act as a recipient/consumer of the secret. The computing resources 102 can include one or more servers or a cloud-based environment in a serverless architecture, for instance, where resources are provisioned for use as needed. The computing resources 102 can include, for example, a plurality of memory resources 104 and a plurality of processor resources 108 configured to access the memory resources 104 and execute a plurality of instructions to perform a plurality of operations. Memory resources 104 can include a memory device, also referred to herein as "computer-readable memory" (e.g., non-transitory memory devices as opposed to transmission devices or media), and may generally store program instructions, code, and/or modules that, when executed by the processor resources 108 (e.g., processing devices), cause a particular machine to function in accordance with one or more embodiments described herein. The memory resources 104 and processor resources 108 can be scalable to match the computing demands. The user systems 106 may each be implemented using a computer executing one or more computer programs for carrying out processes described herein. In one embodiment, the user systems 106 may each be a personal computer (e.g., a laptop, desktop, etc.), a network server-attached terminal (e.g., a thin client operating within a network), or a portable device (e.g., a tablet computer, personal digital assistant, smart phone, etc.).

To reach computing resources 102 through a network, a domain name server 110 (DNS) can be used for mapping domain names to network addresses and maintaining secure communication paths. For example, communication between the DNS 110 and computing resources 102 can be through a secure socket layer (SSL). In some aspects, the computing resources 102 can interface with other systems, such as a sign-in system 112 that verifies user identity and permissions of a user accessing the computing resources 102 through the user systems 106. A secrets manager front end 114 can orchestrate access to various portions of the secrets manager functions of the system 100A. For example, the user systems 106 can communicate with the secrets manager front end 114 to request encryption of data as a secret or to request decryption of a secret to extract encrypted data. The secrets manager front end 114 can interface with the sign-in system 112 to pass a login request from a user of the user systems 106 to obtain verified user information based on user state 116 data managed by the sign-in system 112. The secrets manager front end 114 can also interface with a file system 118 and a data vault 120. The file system 118 can store various types of encrypted files, such as a database 122 and one or more logs 124 (also referred to as log 124). Transactions requested and performed through the secrets manager front end 114 can be tracked in one or more logs 124 for security traceability and auditing. The secrets manager front end 114 can provide automation for a user to interact with the database 122. Rather than directly accessing the database 122, the secrets manager front end 114 can use the data vault 120 to request and retrieve information from the database 122. The secrets manager front end 114 can handle user tokens for website access, perform encryption, and handle verification of users to a secret. The secrets manager front end 114 may only use temporary storage and does not retain copies of data transmitted to the database 122 or retrieved from the database 122. The database 122 stores information and may not perform any checking of the stored data. The secrets manager front end 114 can perform as an access control to allow specific interactions with the data vault 120

In some embodiments, the data vault 120 can establish storage and retrieval constraints for the content stored in the database 122. The data vault 120 can use various types of tokens and implement time-to-live policies to ensure that single-use secrets remain encrypted with limited access and are removed upon expiration of a time-to-live limit as further described herein. As one example, content can be stored as a record 128 in the database 122. The record 128 can include an ephemeral token 130 that wraps a secret 132 as an encrypted data value. The ephemeral token 130 can have an associated time-to-live (TTL) 134 and an associated encrypted recipient identifier 136 as part of the record 128. The time-to-live 134 can be wrapped with the secret 132 as part of the ephemeral token 130 or can be separately associated as part of the same record 128. Management and use of the time-to-live 134 can be performed by the data vault 120. In some embodiments, the ephemeral token 130 can be a single-use token, such that upon successfully accessing the secret 132, the ephemeral token 130 and/or entire record 128 can be removed/deleted from the database 122. The record 128 can be indexed or referenced by a multi-use token 140. The multi-use token 140 can be returned through the secrets manager front end 114 as a reference to access the secret 132 indirectly. For example, a user can request token generation for a data value and identify an intended recipient. Upon encryption of the data value as the secret 132 wrapped in ephemeral token 130 and storage of associated information (e.g., time-to-live 134 and/or encrypted recipient identifier 136) in the record 128, the multi-use token 140 can be returned to the user or sent directly to the intended recipient identified in the encrypted recipient identifier 136. The multi-use token 140 can also wrap recipient information. Upon the recipient attempting to access the secret 132 through the multi-use token 140, the identity of the recipient can be verified based on a comparison with the encrypted recipient identifier 136. If the recipient attempting to access the secret 132 through the multi-use token 140 does not match the intended recipient identified in the encrypted recipient identifier 136, then the access attempt will be denied, and the failed attempt can be recorded in the log 124. Recipients can be individuals, lists, or groups. For instance, a groups of users can be listed as recipients in the encrypted recipient identifier 136, and the first of the recipients who successfully accesses to the secret 132 can trigger deletion of the secret 132 from the database 122. The time-to-live 134 can also be checked to ensure that the ephemeral token 130 has not expired. An attempt to access an expired token can also be tracked in the log 124. In some embodiments, the ephemeral token 130 can be returned and used as a reference to the secret 132 stored in the database 122.

Although the example of FIG. 1A depicts one configuration of system 100A, it will be understood that many other configurations are contemplated. For instance, there can be a greater or lesser number of system elements beyond those depicted in the example of FIG. 1A.

Figure 1B:
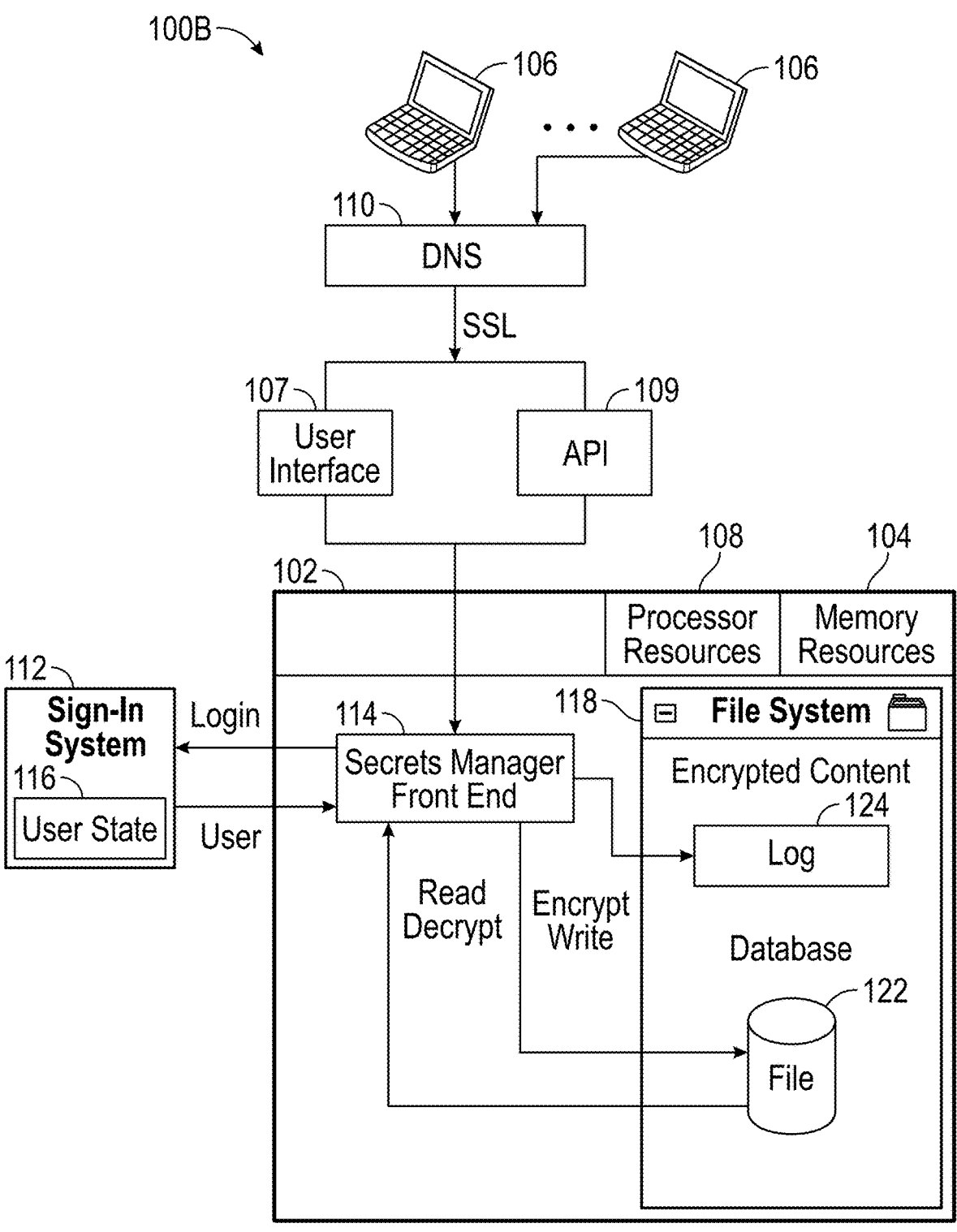
FIG. 1B depicts a block diagram of a system according to some embodiments of the present invention.

FIG. 1B depicts a system 100B as a variation of the system 100A of FIG. 1A. In the system 100B, like elements can have similar content and functionality as described in reference to the system 100A of FIG. 1A. As one variation, the user systems 106 can access the secrets manager front end 114 through either a user interface 107 or an application programming interface (API) 109. The user interface 107 can support user interaction directly, while the API 109 can support automated interactions, such as through scripts or program calls. As such, the API 109 can perform operations of the secrets manager front end 114, such as handling user tokens for access, performing encryption, and handling verification of a user to a secret without the user directly inputting data or viewing results through the user interface 107. As a further variation, the functionality of the data vault 120 of FIG. 1A can be incorporated into the secrets manager front end 114. For instance, rather the making requests and receiving responses from the data vault 120 of FIG. 1A, the secrets manager front end 114 may directly make encrypting writes to the database 122 and decrypting reads from the database 122. Further, management and use of the time-to-live 134 can be performed by the secrets manager front end 114, with the time-to-live 134 stored in the database 122. This direct access approach may result in faster response times by avoiding use of the data vault 120 of FIG. 1A as an intermediate component between the secrets manager front end 114 and the database 122.

Figure 2:
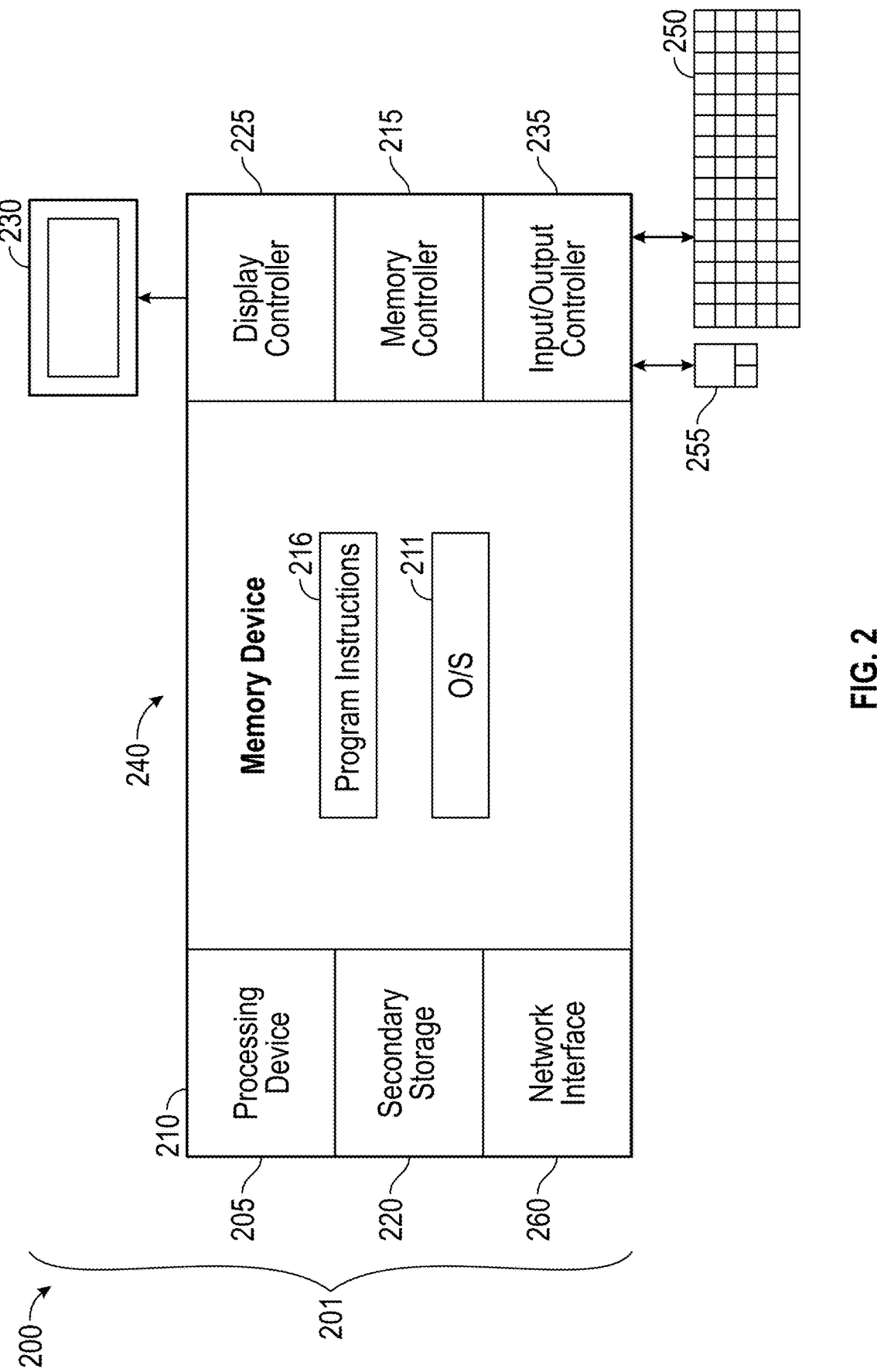
FIG. 2 depicts a block diagram of a system according to some embodiments of the present invention.

FIG. 2 depicts a block diagram of a system 200 according to an embodiment. The system 200 is depicted embodied in a computer 201 in FIG. 2. The system 200 is an example of one of the user systems 106 and/or a portion of computing resources 102 of FIGS. 1A and 1B.

In an exemplary embodiment, in terms of hardware architecture, as shown in FIG. 2, the computer 201 includes a processing device 205 and a memory device 210 coupled to a memory controller 215 and an input/output controller 235. The input/output controller 235 may comprise, for example, one or more buses or other wired or wireless connections, as is known in the art. The input/output controller 235 may have additional elements, which are omitted for simplicity, such as controllers, buffers (caches), drivers, repeaters, and receivers, to enable communications. Further, the computer 201 may include address, control, and/or data connections to enable appropriate communications among the aforementioned components.

In an exemplary embodiment, a keyboard 250 and mouse 255 or similar devices can be coupled to the input/output controller 235. Alternatively, input may be received via a touch-sensitive or motion-sensitive interface (not depicted). The computer 201 can further include a display controller 225 coupled to a display 230.

The processing device 205 comprises a hardware device for executing software, particularly software stored in secondary storage 220 or memory device 210. The processing device 205 may comprise any custom made or commercially available computer processor, a central processing unit (CPU), an auxiliary processor among several processors associated with the computer 201, a semiconductor-based microprocessor (in the form of a microchip or chip set), a macro-processor, or generally any device for executing instructions.

The memory device 210 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), flash memory, programmable read only memory (PROM), tape, compact disk read only memory (CD-ROM), flash drive, disk, hard disk drive, diskette, cartridge, cassette or the like, etc.). Moreover, the memory device 210 may incorporate electronic, magnetic, optical, and/or other types of storage media. Accordingly, the memory device 210 is an example of a tangible computer readable storage medium upon which instructions executable by the processing device 205 may be embodied as a computer program product. The memory device 210 can have a distributed architecture, where various components are situated remotely from one another, but can be accessed by one or more instances of the processing device 205.

The instructions in memory device 210 may include one or more separate programs, each of which comprises an ordered listing of executable instructions for implementing logical functions. In the example of FIG. 2, the instructions in the memory device 210 include a suitable operating system (O/S) 211 and program instructions 216. The operating system 211 essentially controls the execution of other computer programs and provides scheduling, input-output control, file and data management, memory management, and communication control and related services. When the computer 201 is in operation, the processing device 205 is configured to execute instructions stored within the memory device 210, to communicate data to and from the memory device 210, and to generally control operations of the computer 201 pursuant to the instructions. Examples of program instructions 216 can include instructions to implement the secrets manager front end 114 of FIG. 1A, 1B.

The computer 201 of FIG. 2 also includes a network interface 260 that can establish communication channels with one or more other computer systems via one or more network links. The network interface 260 can support wired and/or wireless communication protocols known in the art. For example, when embodied in one of the user systems 106, the network interface 260 can establish communication channels with the computing resources 102 of FIG. 1A, 1B.

Figure 3:
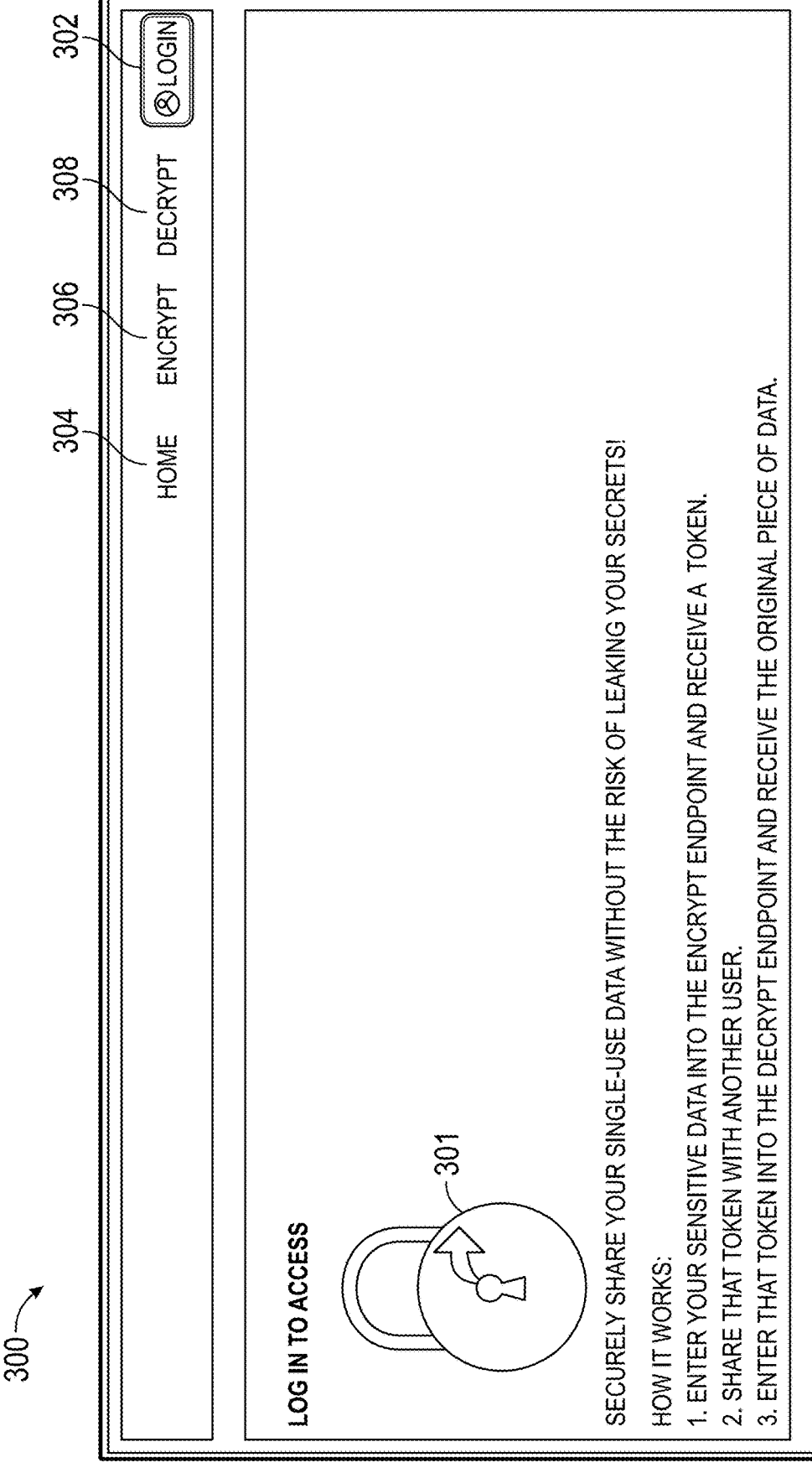
FIG. 3 depicts an example of a login user interface according to some embodiments of the present invention.
Figure 4:
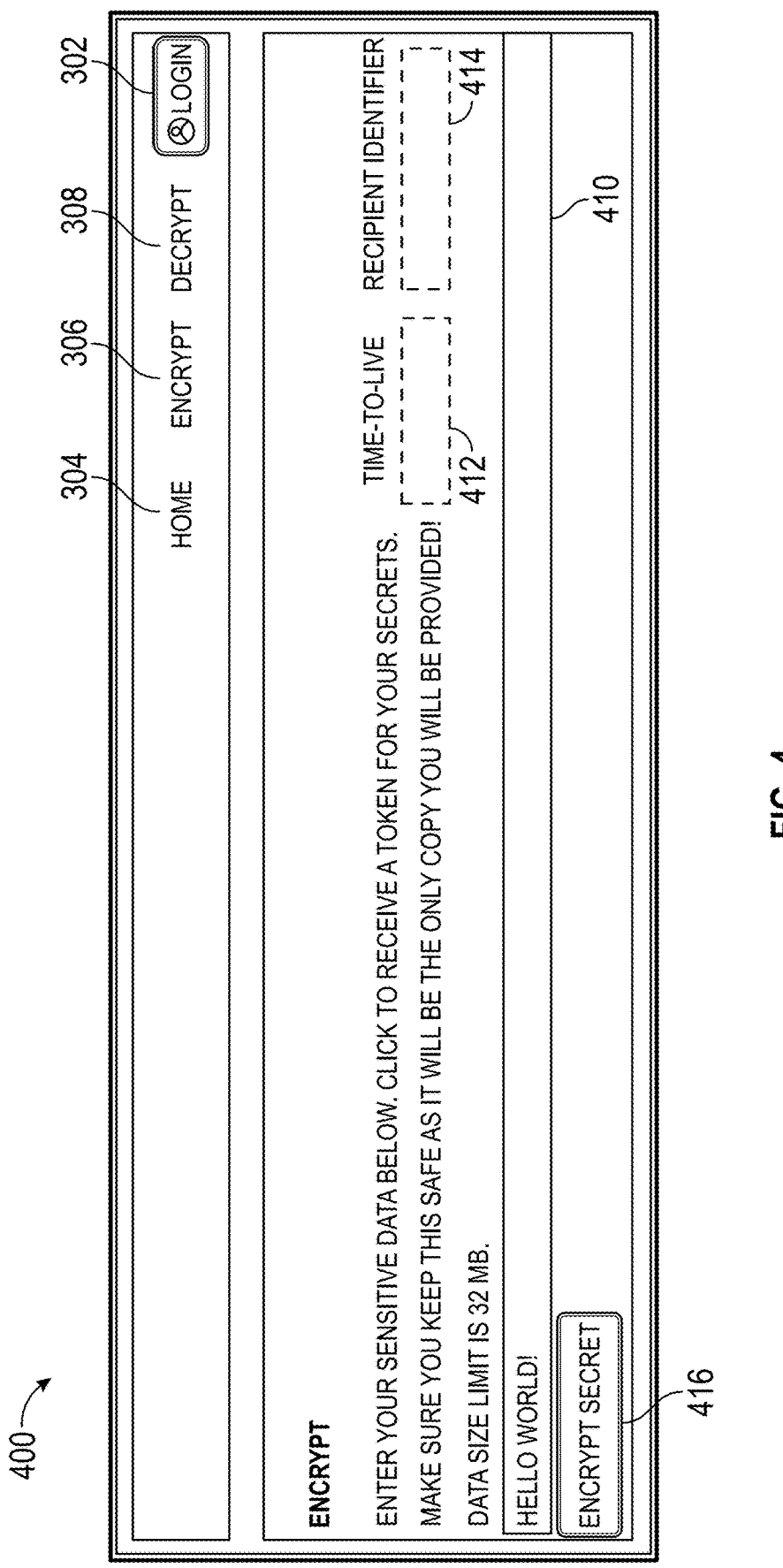
FIG. 4 depicts an example of an encryption user interface according to some embodiments of the present invention.

FIG. 3 depicts an example of a login user interface 300 according to some embodiments. The login user interface 300 can be generated by the secrets manager front end 114 of FIG. 1A, 1B and displayed at one of the user systems 106 of FIG. 1A, 1B to encrypt data as a secret or decrypt a secret to extract the data. The login user interface 300 can include a prompt and/or icon 301 to request a login. Upon a user selecting a login button 302, the secrets manager front end 114 can access the sign-in system 112 of FIG. 1A, 1B to confirm the identity of the user. The login user interface 300 can also include navigation links to various user interfaces through a home link 304, an encrypt link 306, and a decrypt link 308. Upon selecting the encrypt link 306, secrets manager front end 114 can display an encryption user interface 400, such as that depicted in the example of FIG. 4.

The encryption user interface 400, according to some embodiments, can include the login button 302 and navigation links of FIG. 3 (e.g., home link 304, encrypt link 306, and decrypt link 308). The encryption user interface 400 may be reached through selection of the encrypt link 306. The encryption user interface 400 can also include a data input field 410 where data to be encrypted may be typed or pasted as text values for secret creation as a token upon selection of an encrypt secret button 416. In some embodiments, the data input field 410 may expand to include multiple lines of text. Further, rather than directly entering text into the data input field 410, an input file can be selected or dragged into the encryption user interface 400 to serve as input data (e.g., a text file). The encryption user interface 400 can also include a time-to-live 412 as an expiration time from encryption. If the time-to-live 412 expires before a recipient attempts to decrypt an encrypted secret, the encrypted secret can be deleted or otherwise be blocked from decryption. The encryption user interface 400 can also include a recipient identifier 414, where a user initiating encryption can identify a recipient of the resulting secret. The recipient identifier 414 can be an email address or other such user identifier, such as user name. When the recipient identifier 414 is included, recipient verification can be used to ensure that the intended recipient is the user attempting to perform decryption. If a user attempts to decrypt a secret and that user does not match the recipient identifier 414, then the attempted decryption can be blocked and the attempt recorded in a log 124 of FIG. 1A, 1B. In some embodiments, the intended recipient can be a group, where one or more users who are members of the group can access the resulting secret. Other fields can also be included in the encryption user interface 400 beyond those depicted in the example of FIG. 4.

Figure 5:
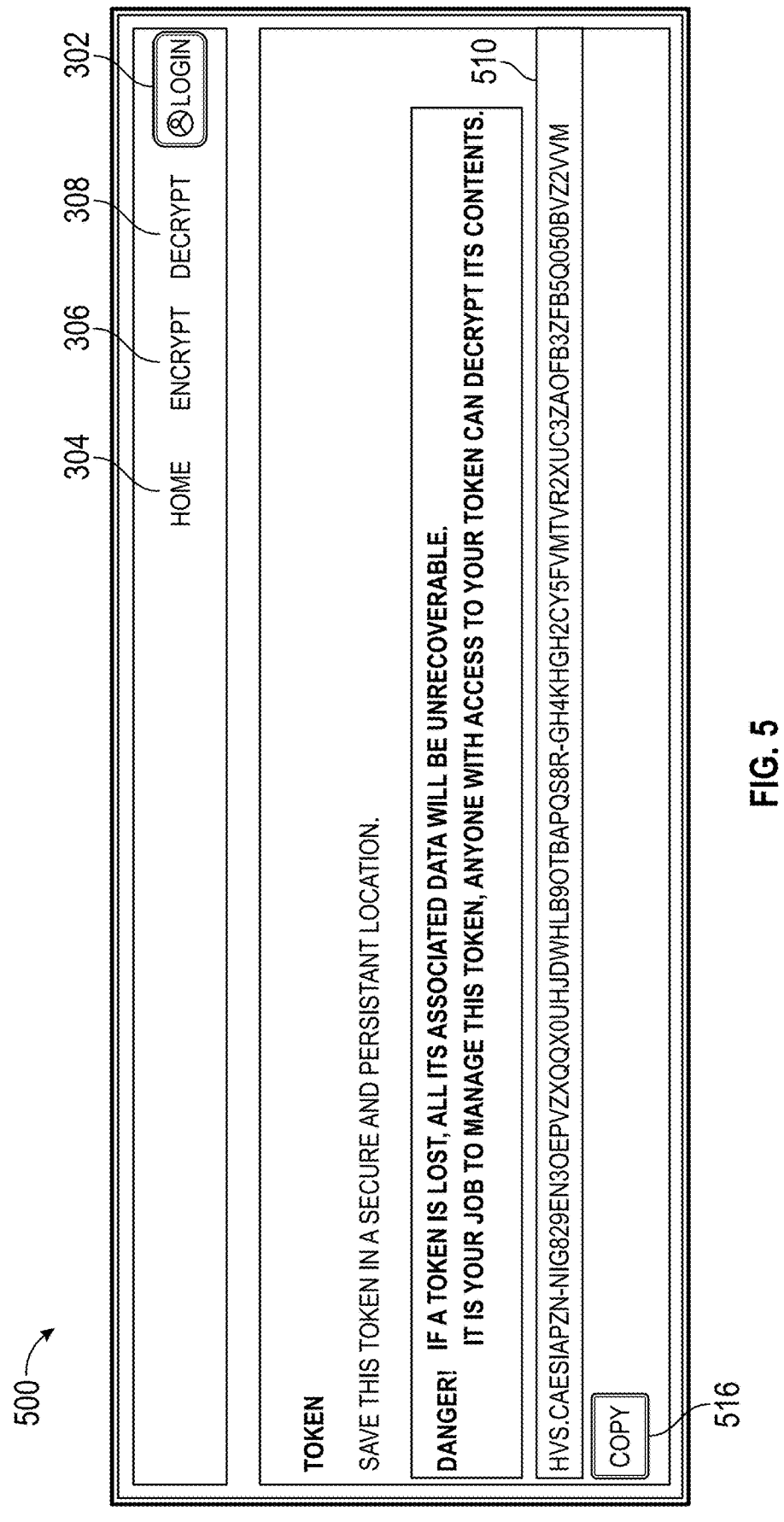
FIG. 5 depicts an example of a token display user interface according to some embodiments of the present invention.

FIG. 5 depicts an example of a token display user interface 500 according to some embodiments. The token display user interface 500, according to some embodiments, can include the login button 302 and navigation links of FIG. 3 (e.g., home link 304, encrypt link 306, and decrypt link 308). The token display user interface 500 can also include a token field 510 where data input in the data input field 410 of FIG. 4 can be viewed as an encrypted value representing a secret ready to be copied and shared with an intended recipient, such as the user or group identified in the recipient identifier 414 of FIG. 4. In some aspects, the token field 510 can be copied using a copy button 516. Alternatively, the token field 510 can be copied using selection and copy commands with keyboard or mouse/selector based commands. The copy button 516 may result in the contents of the token field 510 being copied to a clipboard of the user who created the token and made available to paste into other applications or web pages (e.g., an email or messaging system). In some embodiments, selection of the copy button 516 can trigger creation of a new email or message with the contents of the token field 510 included in the body of the email or message and the targeted recipient auto-populated using contents of the recipient identifier 414 of FIG. 4. The email or message may include a one-click link that upon clicking by the recipient results in launching the secrets manager front end 114 with the token residing in a clipboard of the recipient ready to be pasted/entered for decryption after login. When an automated email or message is generated, the user (e.g., the producer of the token) may be prompted to confirm or edit the resulting email or message before it is sent to the recipient. Alternatively, generation of the automated email or message can result in automated sending of the email or message to the user identified by the recipient identifier 414 of FIG. 4. Although one example is depicted in FIG. 5, it will be understood that many process variations are possible.

Figure 6:
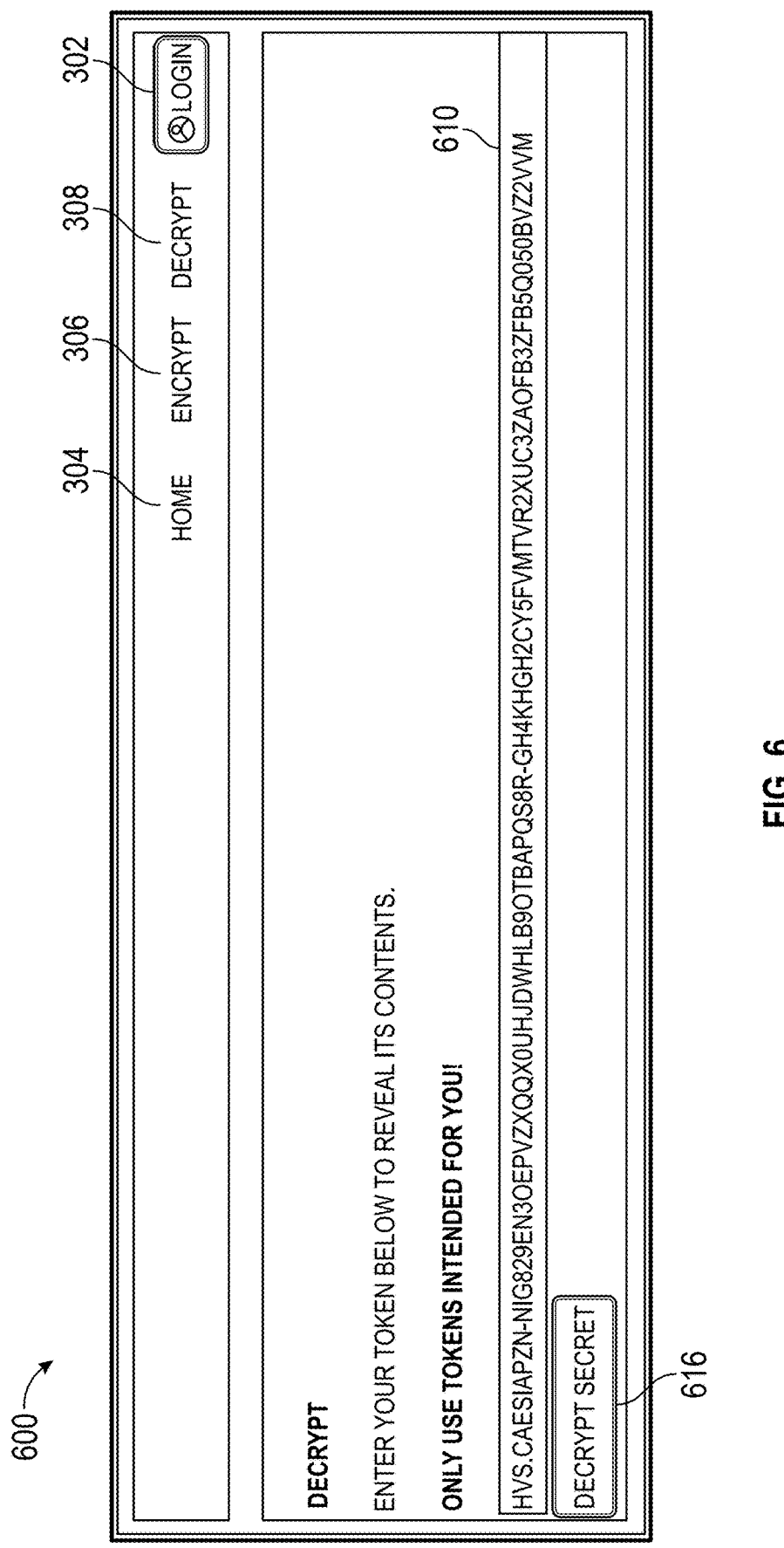
FIG. 6 depicts an example of a decryption user interface according to some embodiments of the present invention.

FIG. 6 depicts an example of a decryption user interface 600 according to some embodiments. The decryption user interface 600, according to some embodiments, can include the login button 302 and navigation links of FIG. 3 (e.g., home link 304, encrypt link 306, and decrypt link 308). The decryption user interface 600 may be reached through selection of the decrypt link 308. The decryption user interface 600 can also include a decryption field 610 where data to be decrypted may be typed or pasted from a clipboard as text values for secret decryption of a token upon selection of a decrypt secret button 616. In some embodiments, the decryption field 610 may expand to include multiple lines of text. Further, rather than directly entering text into the decryption field 610, an input file can be selected or dragged into the decryption user interface 600 to serve as input data (e.g., a text file) including a token to be decrypted. Where the recipient identifier 414 of FIG. 4 was included to create a token, a user identifier of the user currently logged-in can be used to verify that the user requesting decryption is the intended recipient before allowing the token to be decrypted. If a user attempts to decrypt a secret associated with the token and that user does not match the recipient identifier 414 of FIG. 4, then the attempted decryption can be blocked and the attempt recorded in the log 124 of FIG. 1A, 1B. Although one example is depicted in FIG. 6, it will be understood that many variations are possible.

Figure 7:
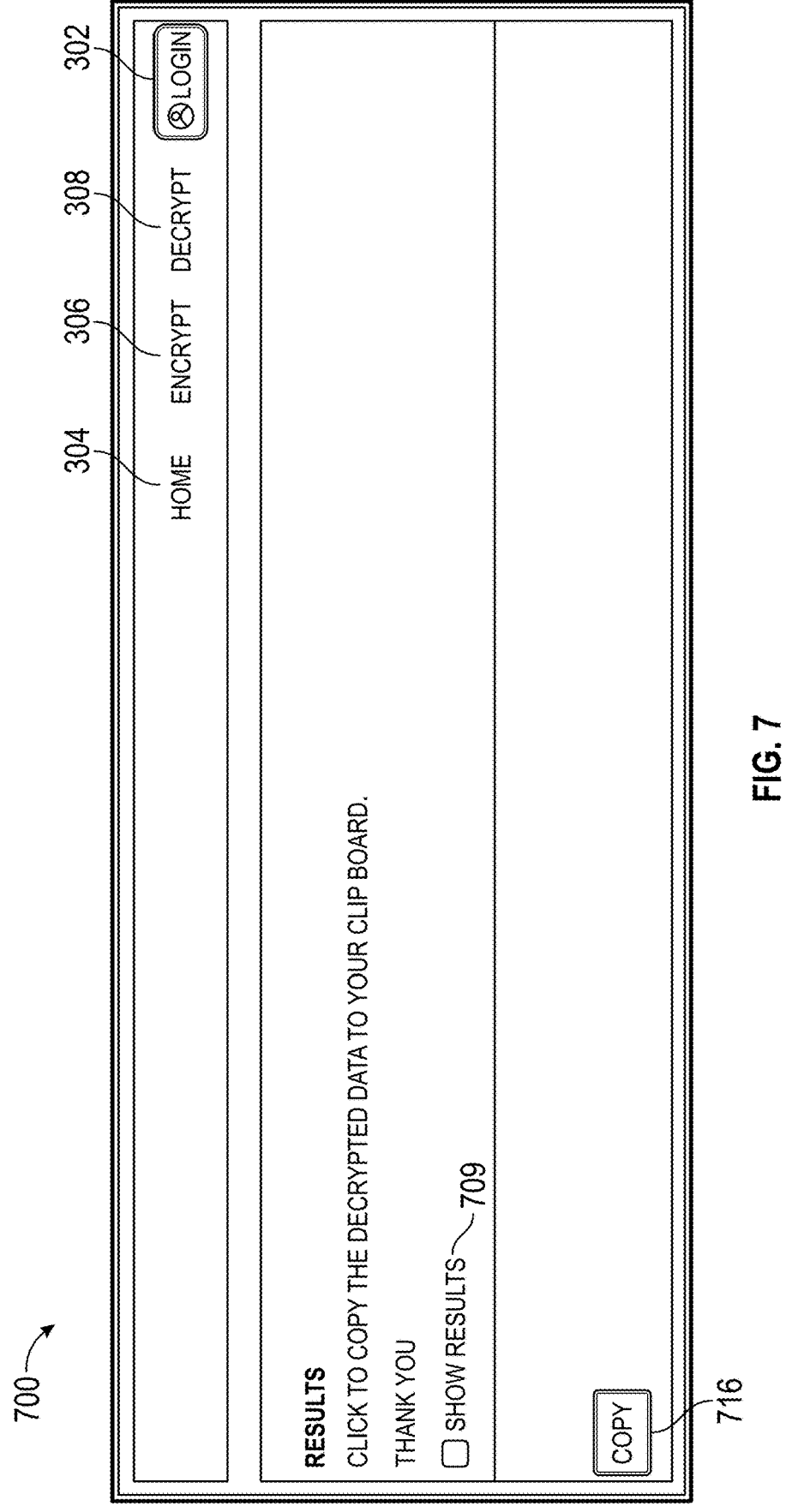
FIG. 7 depicts an example of a results user interface in a first state according to some embodiments of the present invention.
Figure 8:
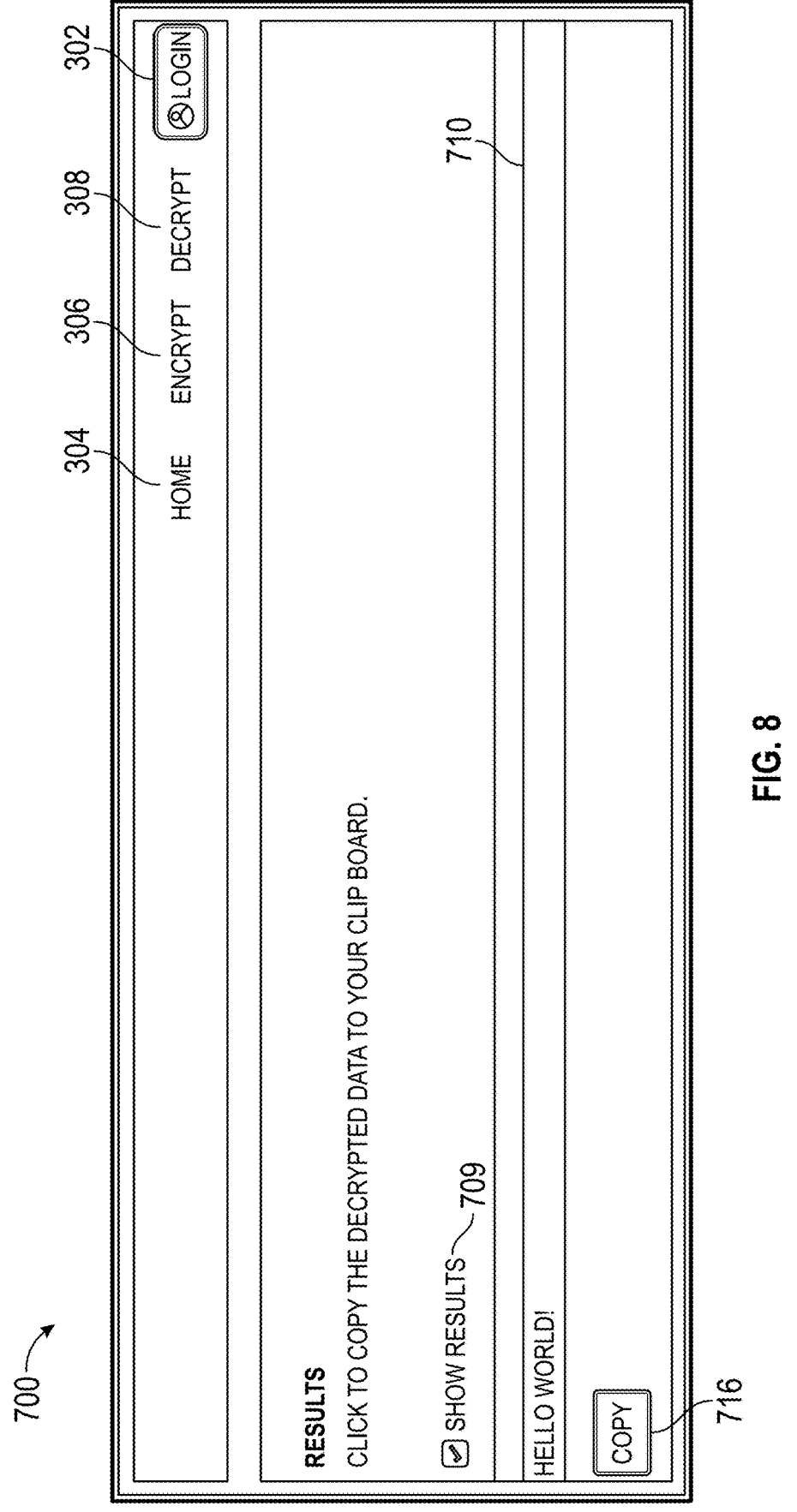
FIG. 8 depicts an example of the results user interface in a second state according to some embodiments of the present invention.

FIG. 7 depicts an example of a results user interface 700 in a first state according to some embodiments. The results user interface 700, according to some embodiments, can include the login button 302 and navigation links of FIG. 3 (e.g., home link 304, encrypt link 306, and decrypt link 308). The results user interface 700 can be reached after selecting the decrypt secret button 616 from the decryption user interface 600 of FIG. 6. Upon successful decryption of the decryption field 610 of FIG. 6 by a user identified by the recipient identifier 414 of FIG. 4 and within a time limit defined by the time-to-live 412 of FIG. 4, the result may remain hidden from view unless a show results checkbox 709 is selected. If the show results checkbox 709 is selected, then in a second state, the decrypted secret can appear in a results field 710 as depicted in the example of FIG. 8. Regardless of whether the results field 710 is visible, selection of copy button 716 can copy the results to the clipboard of the user (e.g., the consumer of the token) for use. The contents of the results field 710 can also be copied, for example, using selection and copy commands with keyboard or mouse/selector based commands. Although an example is depicted in the examples of FIGS. 7 and 8, it will be understood that many variations are possible.

Figure 9:
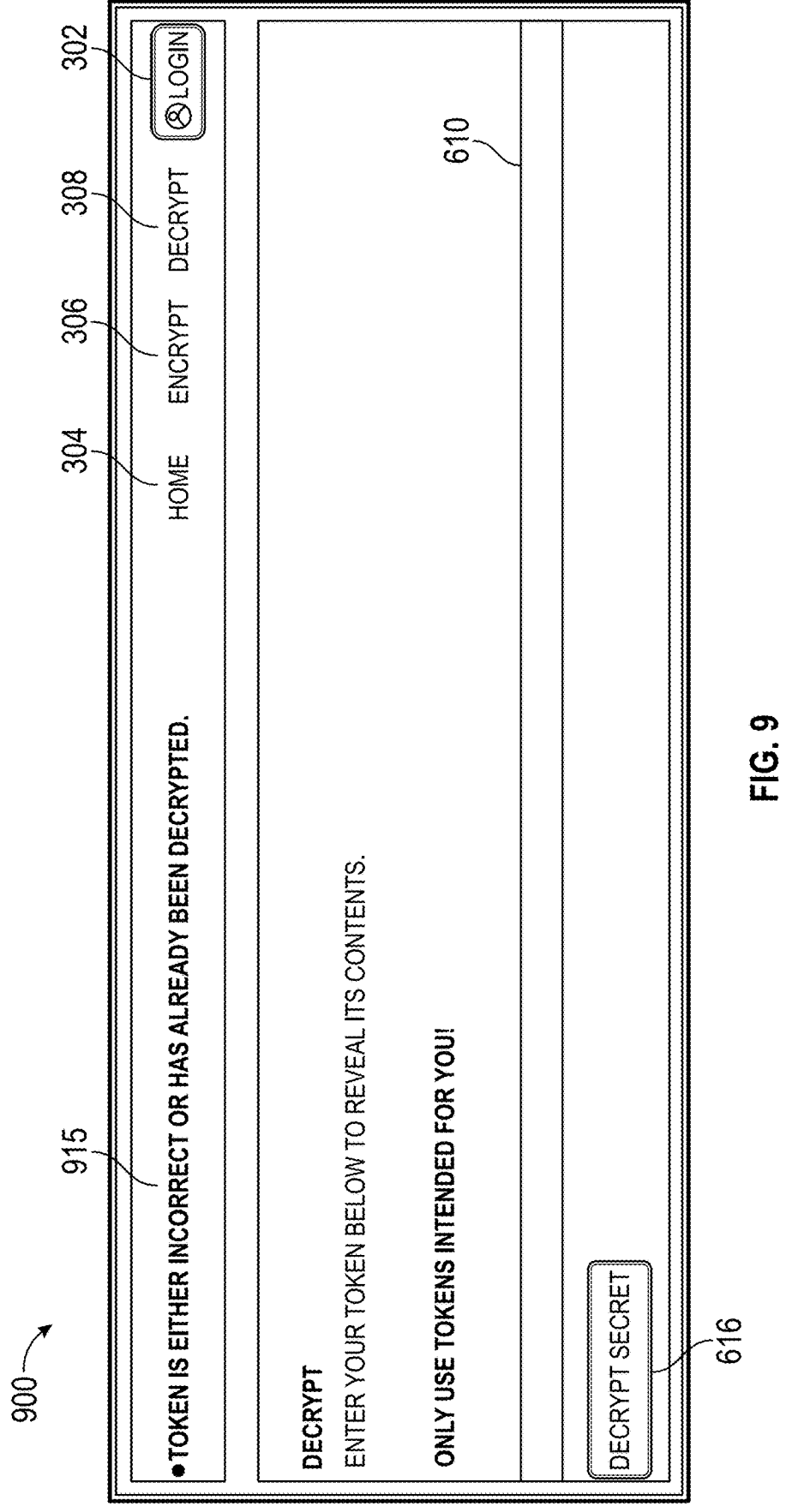
FIG. 9 depicts an example of a token decryption error user interface according to some embodiments of the present invention.

FIG. 9 depicts an example of a token decryption error user interface 900 according to some embodiments. The example of FIG. 9 depicts one possible type of decryption error message 915 that may be displayed upon selection of the decrypt secret button 616 for the decryption field 610 from the decryption user interface 600. Upon detecting an error, such as an incorrect token or attempted decryption of a previously decrypted token, the token decryption error user interface 900 can be displayed and include the decrypt secret button 616 and the decryption field 610 to provide the user with another decryption opportunity, for instance, in case of a typographical error or copy-paste error in the decryption field 610. Although one example is depicted in FIG. 9, it will be understood that many variations are possible.

Figure 10:
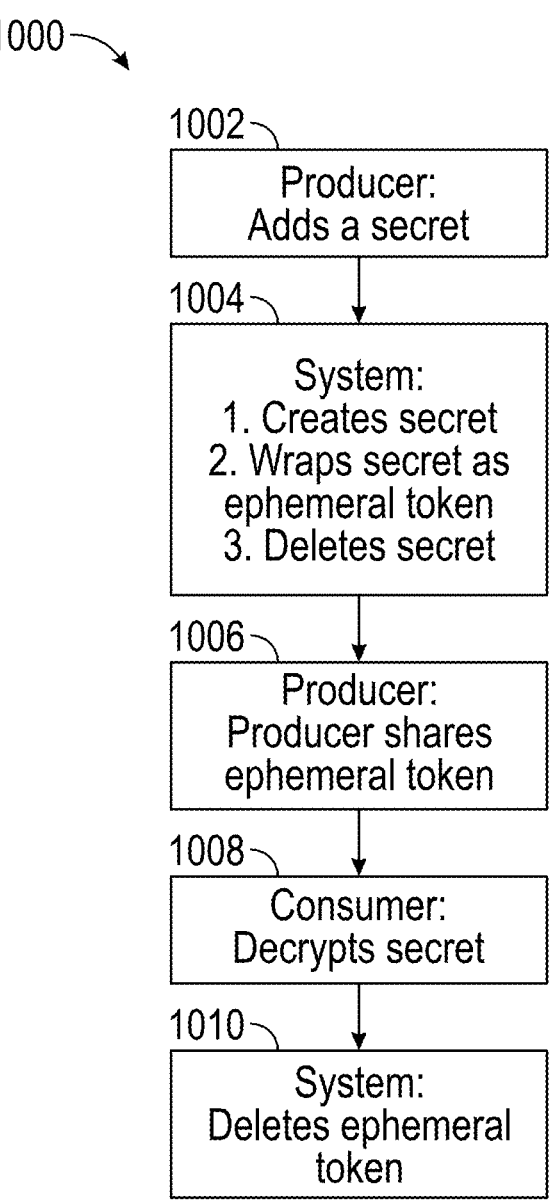
FIG. 10 depicts an example of a secrets manager workflow according to some embodiments of the present invention.

Turning now to FIG. 10, a process flow 1000 of a secrets manager workflow is depicted according to an embodiment. The process flow 1000 includes a number of steps that may be performed in the depicted sequence or in an alternate sequence. The process flow 1000 may be performed by the system 100A of FIG. 1A or system 100B of FIG. 1B. The process flow 1000 is described in reference to FIGS. 1-10.

At step 1002, a producer (e.g., a user intending to produce a token) logs-in through the login user interface 300 and selects the encrypt link 306 to add a secret, for instance, by entering text into the data input field 410 of the encryption user interface 400.

At step 1004, the system 100A, 100B can detect selection of the encrypt secret button 416 and create a secret through the secrets manager front end 114. Secret creation can include encryption of text from the data input field 410 as a token, which is wrapped as an ephemeral token (e.g., a short-lived token) using the time-to-live 412 and/or the recipient identifier 414. Upon creating the ephemeral token, the original text of the data input field 410 can be deleted. This can be performed, for example, by the secrets manager front end 114 providing the ephemeral token to the data vault 120 for encrypted storage in the database 122. The data vault 120 can also be provided with the time-to-live 412 and/or the recipient identifier 414. In some embodiments, the token is wrapped by the data vault 120 or database 122 with the recipient identifier 414 to form the ephemeral token. The ephemeral token can be a single-use or multi-use token. As one example, the ephemeral token stored in the database 122 is a single-use token, and a multi-use token is provided to allow more than one attempted access of the single-use token, for instance, to prevent an errant access attempt from deleting the single-use token.

At step 1006, the producer shares the ephemeral token (which can be shared as a multi-use token referencing the ephemeral token) with a desired recipient, such as the user identified by the recipient identifier 414. Sharing can be performed using the copy button 516 and pasting the token to an email or other message type.

At step 1008, the recipient acts as a consumer (e.g., a user intending to consume a token) and logs-in through the login user interface 300 and selects the decrypt link 308 to reach the decryption user interface 600. The user can paste or type the token into the decryption field 610 and select the decrypt secret button 616. The secrets manager front end 114 can post the token entered in the decryption field 610 to the data vault 120 to access encrypted storage in the database 122. The encoded contents associated with the token in the database 122 can be returned to the data vault 120 and/or the secrets manager front end 114. The secrets manager front end 114 or the data vault 120 can decrypt the contents to check that the logged-in user matches the recipient identifier encoded with the token. The recipient identifier can be associated with one or more users. Upon a successful determination, the results user interface 700 can be displayed. Upon a failure, the token decryption error user interface 900 can be displayed.

When a successful decryption and user verification occurs, the sensitive data and associated information can be removed from the database 122 at step 1010 as part of deleting the ephemeral token. The decrypted sensitive data is also not retained by the data vault 120 and the secrets manager front end 114. Therefore, if the user closes the results user interface 700 before copying the decrypted text, the process must be repeated, since the associated data and token are not retained. Although FIG. 10 is described with reference to the data vault 120, the data vault 120 can be omitted, such as in the system 100B, with associated functionality shifted to the secrets manager front end 114, for example.

Figure 11:
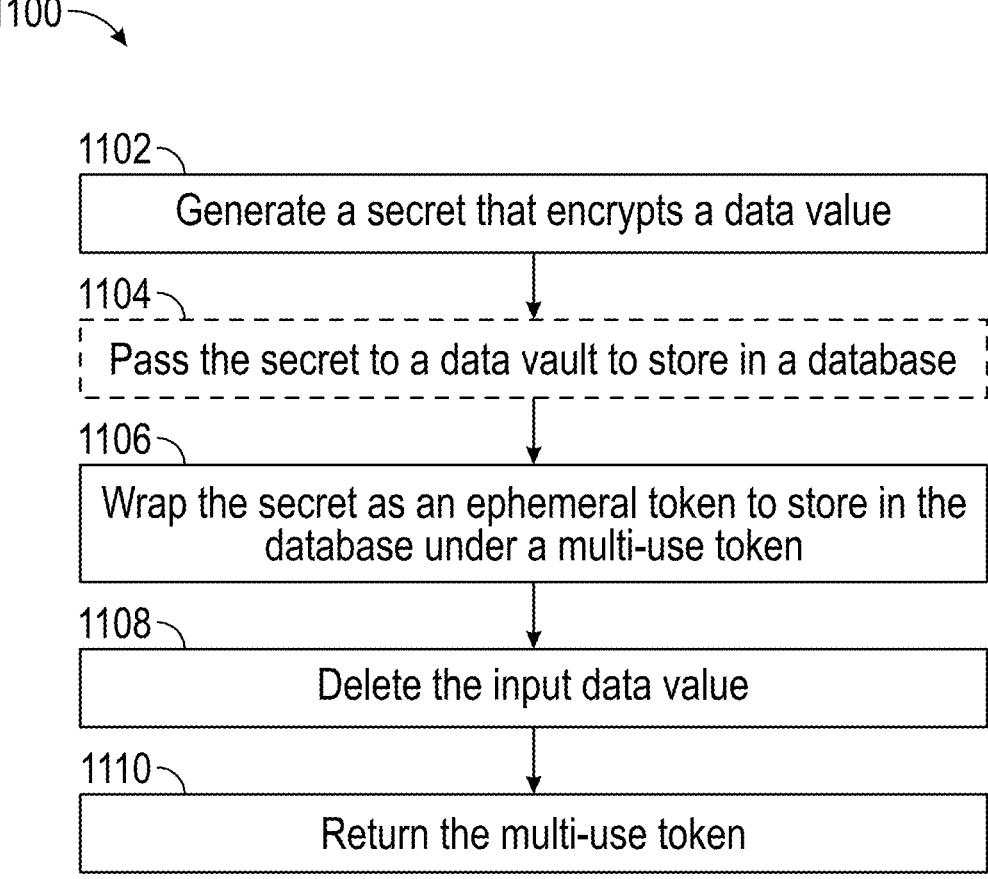
FIG. 11 depicts a token generation process according to some embodiments of the present invention.

Turning now to FIG. 11, a process flow 1100 of a token generation process is depicted according to an embodiment. The process flow 1100 includes a number of steps that may be performed in the depicted sequence or in an alternate sequence. The process flow 1100 may be performed by the system 100A of FIG. 1A or system 100B of FIG. 1B. The process flow 1100 is described in reference to FIGS. 1-11.

At step 1102, the system 100A, 100B can generate a secret that encrypts a data value. For example, after logging-in through the login user interface 300 and selecting the encrypt link 306, the system 100A, 100B can generate a secret as an encryption of text entered in the data input field 410 upon selection of the encrypt secret button 416. At step 1104, the system 100A can pass the secret to the data vault 120 to store in the database 122 in embodiments that include the data vault 120. At step 1106, the system 100A, 100B can wrap the secret as an ephemeral token, such as secret 132 wrapped by ephemeral token 130, to store in the database 122 under a multi-use token, such as multi-use token 140. At step 1108, the system 100A, 100B can delete the input data value received through the data input field 410. At step 1110, the system 100A, 100B can return the multi-use token, for instance, through the results user interface 700.

In some embodiments, rather than receiving the data value through the data input field 410, data can be passed through one or more application programming interfaces (APIs), such as API 109. The APIs can include support for passing tokens, triggering encryption, decryption, and credential verification without needing to use the user interfaces of FIGS. 3-9. The use of APIs can support automation and integration with various applications and/or webpages.

In some embodiments, the ephemeral token can be a single-use token.

In some embodiments, the secret can be wrapped with an encoding of a recipient identifier, such as an encoded version of the recipient identifier 414.

In some embodiments, the recipient identifier 414 can be stored in the database 122 as an encrypted recipient identifier 136 and used to verify an identity of a user attempting to decrypt the data value.

In some embodiments, the recipient identifier 414 can include a recipient email address, and the multi-use token can be automatically sent to the recipient email address upon the return of the multi-use token.

In some embodiments, the ephemeral token can be associated with a time-to-live, such as time-to-live 412, which can be stored in the database 122 as time-to-live 134.

In some embodiments, the ephemeral token can be deleted from the database 122 after being accessed once or upon expiration of the time-to-live 412.

In some embodiments, the time-to-live 412 can be input through a user interface along with the data value, such as through the encryption user interface 400 and/or user interface 107 generally. The time-to-live 412 may have a default value. In some aspects, the time-to-live 412 may not be visible or editable.

In some embodiments, the data value can be a clear-text value. The clear-text need not be user-readable, as it can be a text-based encoding of a data object or code.

In some embodiments, a record of an attempted encryption or decryption of the data value can be stored in a log, such as in one or more logs 124.

In some embodiments, the data value can include one or more of: user credentials, passwords, encryption keys, documents, server credentials, storage credentials, and text-encoded files.

In some embodiments, access to encrypt and decrypt the data value can be constrained through a user login interface, such as login user interface 300.

In some embodiments, entry of the data value to encrypt can be through a web page using a secure sockets layer.

In some embodiments, the multi-use token can be returned as a one-click uniform resource locator that initiates accessing of the ephemeral token on behalf of a recipient of the multi-use token upon a single-click event.

In some embodiments, an expected expiration of the ephemeral token can be monitored, and an expiration warning message can be sent to a recipient of the multi-use token based on determining that a remaining time-to-live of the ephemeral token is below a threshold value. For example, an ephemeral token approaching expiration without being accessed may trigger a reminder for the user (e.g., intended consumer of the token) to access the ephemeral token.

Figure 12:
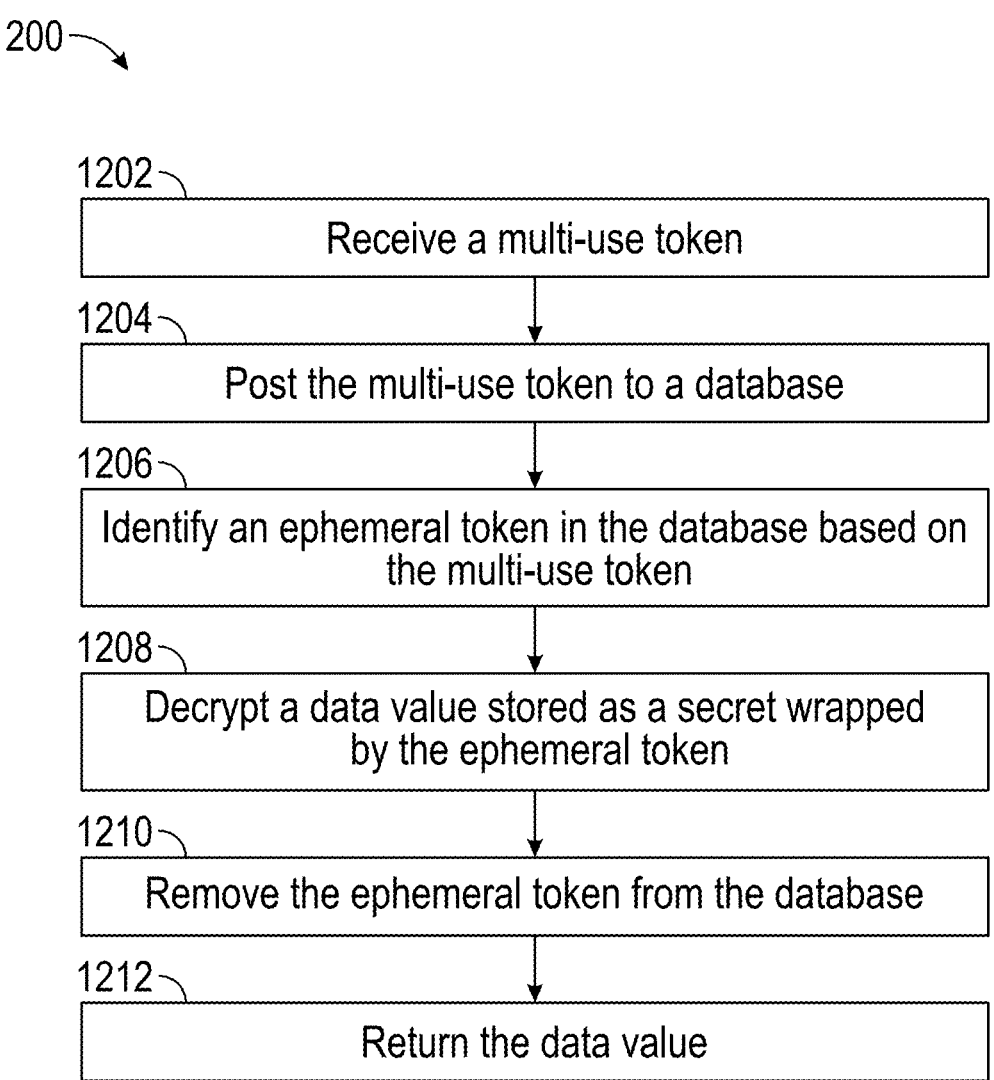
FIG. 12 depicts a token unwrapping and decryption process according to some embodiments of the present invention.

Turning now to FIG. 12, a process flow 1200 of a token unwrapping and decryption process is depicted according to an embodiment. The process flow 1200 includes a number of steps that may be performed in the depicted sequence or in an alternate sequence. The process flow 1200 may be performed by the system 100A of FIG. 1A or system 100B of FIG. 1B. The process flow 1200 is described in reference to FIGS. 1-12.

At step 1202, the system 100A, 100B can receive a multi-use token. At step 1204, the system 100A, 100B can post the multi-use token to the database 122. At step 1206, the system 100A, 100B can identify an ephemeral token in the database 122 based on the multi-use token. At step 1208, the system 100A, 100B can decrypt the data value stored as a secret wrapped by the ephemeral token. At step 1210, the system 100A, 100B can remove the ephemeral token from the database 122. At step 1212, the system 100A, 100B can return the data value. The data value can be returned, for example, through the results user interface 700 or through an API. In some embodiments, unwrapping the ephemeral token can extract a recipient identifier, such as recipient identifier 414, that is used to verify a user initiating decryption.

Technical effects include enhanced computer system security. Constraining access and distribution of secrets in combination with using multiple layers of tokens can reduce the risk of private data being exposed through various email and message distribution systems. Enforcing time-to-live and single use tokens with recipient verification can further enhance security and reduce the risk of unintended distribution and use of a secret intended for a one-time use by a targeted recipient. Different types of encryption can be used throughout the system 100A, 100B for communication and data storage.

Example uses can include application registration with resetting of identifiers and passwords, encryption key sharing, private key passwords, certificate sharing, human resources information, server credentials, storage request credentials, and other such uses.

It will be appreciated that aspects of the present invention may be embodied as a system, method, or computer program product and may take the form of a hardware embodiment, a software embodiment (including firmware, resident software, micro-code, etc.), or a combination thereof. Furthermore, aspects of the present invention may take the form of a computer program product embodied in one or more computer readable medium(s) having computer readable program code embodied thereon.

One or more computer readable medium(s) may be utilized. The computer readable medium may comprise a computer readable signal medium or a computer readable storage medium. A computer readable storage medium may comprise, for example, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable program-mable read-only memory (EPROM or Flash memory), an optical fiber, a portable compact disk read-only memory (CD-ROM), an optical storage device, a magnetic storage device, or any suitable combination of the foregoing. In one aspect, the computer readable storage medium may com-prise a tangible medium containing or storing a program for use by or in connection with an instruction execution system, apparatus, and/or device.

A computer readable signal medium may include a propa-gated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may comprise any com-puter readable medium that is not a computer readable storage medium and that can communicate, propagate, and/or transport a program for use by or in connection with an instruction execution system, apparatus, and/or device.

The computer readable medium may contain program code embodied thereon, which may be transmitted using any appropriate medium, including, but not limited to wireless, wireline, optical fiber cable, RF, etc., or any suitable com-bination of the foregoing. In addition, computer program code for carrying out operations for implementing aspects of the present invention may be written in any combination of one or more programming languages, including an object oriented programming language such as Java, Smalltalk, C++or the like and conventional procedural programming languages, such as the "C" programming language or similar programming languages, as well as Python, macro-based languages, and the like. The program code may execute entirely on the user's computer, partly on the user's com-puter, as a stand-alone software package, partly on the user's computer and partly on a remote computer, or entirely on the remote computer or server.

It will be appreciated that aspects of the present invention are described herein with reference to flowchart illustrations and/or block diagrams of methods, apparatus (systems) and computer program products, according to embodiments of the invention. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block dia-gram block or blocks.

These computer program instructions may also be stored in a computer readable medium that can direct a computer, other programmable data processing apparatus, or other devices to function in a particular manner, such that the instructions stored in the computer readable medium pro-duce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other pro-grammable apparatus provide processes for implementing the functions/acts specified in the flowchart and/or block diagram block or blocks.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative represen-tation associated with the information. In some embodi-ments, indicia of information (or indicative of the informa-tion) may be or include the information itself and/or any portion or component of the information. In some embodi-ments, an indication may include a request, a solicitation, a broadcast, and/or any other form of information gathering and/or dissemination.

Numerous embodiments are described in this patent appli-cation, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present inven-tion(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed computers and/ or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G, 4G, 5G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

What is claimed is:

1. A system, comprising:
a database;
a plurality of memory resources; and
a plurality of processor resources configured to access the memory resources and execute a plurality of instructions to perform a plurality of operations that:
   receive a data value as an input through a secrets manager front end configured to interact with the database;
   store the data value in temporary storage of the memory resources as an input data value;
   generate a secret that encrypts the data value;
   wrap the secret as an ephemeral token to store in the database under a multi-use token;
   delete the input data value from the temporary storage; and
   return the multi-use token through the secrets manager front end as a reference to access the secret.

2. The system of claim 1, wherein the ephemeral token is a single-use token.

3. The system of claim 1, wherein the secret is wrapped with an encoding of a recipient identifier.

4. The system of claim 3, wherein the recipient identifier is stored in the database as an encrypted recipient identifier and used to verify an identity of a user attempting to decrypt the data value.

5. The system of claim 4, wherein the recipient identifier comprises a recipient email address, and the multi-use token is automatically sent to the recipient email address upon the return of the multi-use token.

6. The system of claim 1, wherein the ephemeral token is associated with a time-to-live.

7. The system of claim 6, wherein the ephemeral token is deleted from the database after being accessed once or upon expiration of the time-to-live.

8. The system of claim 6, wherein the time-to-live is input through a user interface along with the data value.

9. The system of claim 1, wherein the data value is received through an application programming interface.

10. The system of claim 1, wherein the data value is a clear-text value.

11. The system of claim 1, wherein the instructions are further configured to perform a plurality of operations that:
  receive the multi-use token;
  post the multi-use token to the database;
  identify the ephemeral token in the database based on the multi-use token;
  decrypt the data value stored as the secret wrapped by the ephemeral token;
  remove the ephemeral token from the database; and
  return the data value.

12. The system of claim 11, wherein the instructions are further configured to perform a plurality of operations that:
  extract a recipient identifier associated with the ephemeral token; and
  verify a user initiating decryption matches the recipient identifier, wherein the recipient identifier is associated with one or more users.

13. The system of claim 1, wherein a record of an attempted encryption or decryption of the data value is stored in a log.

14. The system of claim 1, wherein the data value comprises one or more of: user credentials, passwords, encryption keys, documents, server credentials, storage credentials, and text-encoded files.

15. The system of claim 1, wherein access to encrypt and decrypt the data value is constrained through a user login interface.

16. The system of claim 1, wherein entry of the data value to encrypt is through a web page using a secure sockets layer.

17. The system of claim 1, wherein the multi-use token is returned as a one-click uniform resource locator that initiates accessing of the ephemeral token on behalf of a recipient of the multi-use token upon a single-click event.

18. The system of claim 1, wherein an expected expiration of the ephemeral token is monitored and an expiration warning message is sent to a recipient of the multi-use token based on determining that a remaining time-to-live of the ephemeral token is below a threshold value.

19. The system of claim 1, further comprising a data vault configured to read and write to the database using encryption, wherein the data vault provides an intermediate access control between the database and a secrets manager front end.

20. A computer program product comprising a non-transitory storage medium embodied with computer program instructions that when executed by a computer cause the computer to implement:
  receiving a data value as an input through a secrets manager front end configured to interact with a database;
  storing the data value in temporary storage as an input data value;
  generating a secret that encrypts the data value;
  wrapping the secret as an ephemeral token to store in-a the database under a multi-use token;
  deleting the input data value from the temporary storage; and
  returning the multi-use token through the secrets manager front end as a reference to access the secret.

21. The computer program product of claim 20, wherein the ephemeral token is a single-use token, and the secret is wrapped with an encoding of a recipient identifier.

22. The computer program product of claim 21, wherein the recipient identifier is stored in the database as an encrypted recipient identifier and used to verify an identity of a user attempting to decrypt the data value, and the recipient identifier comprises a recipient email address, and the multi-use token is automatically sent to the recipient email address upon the return of the multi-use token.

23. The computer program product of claim 20, wherein the ephemeral token is associated with a time-to-live, the ephemeral token is deleted from the database after being accessed once or upon expiration of the time-to-live, and the time-to-live is input through a user interface along with the data value.

24. The computer program product of claim 20, further comprising computer program instructions that when executed by the computer cause the computer to implement:
  receiving the multi-use token;
  posting the multi-use token to the database;
  identify the ephemeral token in the database based on the multi-use token;
  decrypting the data value as the secret wrapped by the ephemeral token;
  removing the ephemeral token from the database; and
  returning the data value.

25. The computer program product of claim 20, wherein access to encrypt and decrypt the data value is constrained through a user login interface, and entry of the data value to encrypt is through a web page using a secure sockets layer.

26. The computer program product of claim 20, wherein the multi-use token is returned as a one-click uniform resource locator that initiates accessing of the ephemeral token on behalf of a recipient of the multi-use token upon a single-click event.

* * * * *